Figure 1:
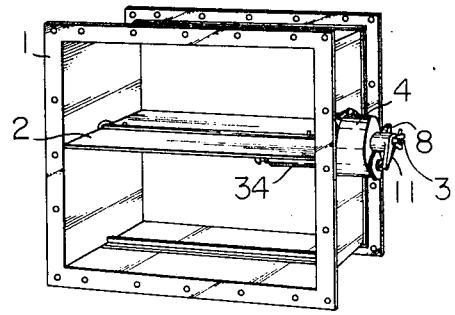

United States Patent

[11] 3,633,600

| [72] | Inventor | Noboru Sadamori<br>Osaka-shi, Osaka, Japan |
| --- | --- | --- |
| [21] | Appl. No. | 879,027 |
| [22] | Filed | Nov. 24, 1969 |
| [45] | Patented | Jan. 11, 1972 |
| [73] | Assignee | Daito Mfg. Co., Ltd.<br>Osaka, Japan |

[54] FUSE-MELT-TYPE APPARATUS FOR INTERCEPTING FLOW OF AN OVERHEATED MEDIUM THROUGH A DUCT
12 Claims, 7 Drawing Figs.

[52] U.S. Cl............................................. 137/77,
98/1, 126/287.5
[51] Int. Cl........................................... F16k 17/38
[50] Field of Search........................................ 137/72–75,
77; 98/1, 86; 126/287.5

[56] References Cited
UNITED STATES PATENTS

| 1,125,416 | 1/1915 | Watson | 137/72 X |
| --- | --- | --- | --- |
| 1,352,255 | 9/1920 | Emerson | 126/287.5 |
| 2,242,738 | 5/1941 | Alton | 126/287.5 |
| 2,287,262 | 6/1942 | Merry | 98/1 |
| 2,588,239 | 3/1952 | Hopton et al. | 126/287.5 X |

*Primary Examiner*—M. Cary Nelson
*Assistant Examiner*—Richard Gerard
*Attorneys*—Robert E. Burns and Emmanuel J. Lobato

ABSTRACT: An apparatus for automatically intercepting a flow of an overheated medium through a conduit duct having a fuse-melt-type temperature detector exposed to the medium flow in an arrangement operable upon a damper shaft for effecting the closing of the damper set at a desirable opening magnitude upon detection of the overheated medium's passing.

PATENTED JAN 11 1972

3,633,600

SHEET 1 OF 2

ATTORNEY

ATTORNEY

FUSE-MELT-TYPE APPARATUS FOR INTERCEPTING FLOW OF AN OVERHEATED MEDIUM THROUGH A DUCT

The present invention relates to an improved fuse-melt-type apparatus for intercepting the flow of an abnormally overheated fluid medium through a conduit duct using an adjustable damper for control of a normally heated fluid medium flow.

In the conventional arrangement of a conduit duct for passing a heated medium, for example a gaseous medium an adjusting damper effects flow control of a normally heated medium and is disposed for intercepting the flow in case of an abnormally overheated medium. This intercepting damper (hereinafter referred to as "fire-damper" is usually of a fuse-melt type. One end of the damper is connected to an upper wall of the duct for supporting the damper within the duct in a disposition parallel to the flow of the medium, that is, in a disposition permitting the flow of the medium. This connection between the damper and the wall is cancelled upon melting of the fuse due to contact with the passing overheated medium. Upon this cancellation of the connection, the damper is placed in a condition or position to intercept the overheated medium flow. In order to prevent flow leakage in this intercepting condition of the damper an adequate packing member is usually disposed onto a bottom wall of the conduit duct.

In the fire damper assembly, a fuse is inserted into the duct through a door formed through the upper wall of the conduit duct and the one end of the damper is connected to the upper wall by the inserted fuse.

In the case of the above-described fire damper arrangement having a flow-control function and a flow-intercepting function, the independent installation of means for carrying out both functions causes increase in manufacturing costs and problems in the installation and operation because of complexity. In addition to the aforementioned drawbacks, the actual intercepting condition of the damper cannot be observed directly from the outside unless the damper wall is provided with a suitable viewing window for supervision thereof. Further, in case melting of the fuse is discovered, it is necessary to replace the old fuse with a new fuse. This is difficult because the operator's hand must be inserted into the conduit duct through the door, which is usually very difficult to do.

Moreover, variation in the tensile property of the material composing the fuse tends to disturb a uniform response of the fuse to the surrounding temperature. For example, when a very weak fuse is provided, it tends to be broken due to the pivoting tendency of the damper itself even prior to contact of the fuse with the overheated fluid medium. Therefore, the passing fluid medium flow may accidentally be intercepted even when it is not desired.

A principal object of the present invention is to provide an improved fuse-melt-type type apparatus capable of controlling a normal temperature flow medium through a conduit duct together with intercepting the flow when the temperature thereof becomes abnormally high.

Another object of the present invention is to provide an improved fuse-melt-type apparatus which is hand-operable outside for defining the opening magnitude of the damper for a desired flow mass of the medium.

A further object of the present invention is to provide an improved fuse-melt-type apparatus capable of carrying out an automatic and instant interception of the flow medium upon abnormal elevation of the medium's temperature.

A still further object of the present invention is to provide an improved fuse-melt-type apparatus wherein replacement of the molten fuse can be performed with considerable ease.

Still another object of the present invention is to provide an improved fuse-melt-type apparatus which can be installed in various types of ducts without difficulty.

A still further object of the present invention is to provide an improved fuse-melt-type apparatus which can effectively control the flow of the medium through the duct with fewer malfunctions when compared with the conventional type apparatuses for this purpose.

Another object of the present invention is to provide an improved fuse-melt-type apparatus having a very simple mechanical construction resulting in a considerable lowering of manufacturing costs.

In order to attain the above-described objects, the apparatus of the invention utilizes a fuse-melt-type temperature detector arranged within a duct being exposed to a fluid medium flow. A damper shaft is always urged to pivot to an angular position whereupon the damper closes the duct to intercept the fluid medium flow. However, during flow of a normal temperature medium flow, the above pivotal tendency of the damper shaft is limited to a desirable opening magnitude of the damper by a rod related to the fuse arrangement. Upon melting of the fuse due to passage of an overheated fluid medium flow, the above limitation by the rod is cancelled, the damper shaft pivots to the above-mentioned angular position so as to close the damper and the flow of the overheated fluid medium is intercepted. In order to accurately define the above-mentioned pivotal angular position of the damper shaft, a recess is formed on the duct wall and is receptive of a locking member related to the damper shaft when it arrives at the mentioned pivotal angular position.

Figure 2:
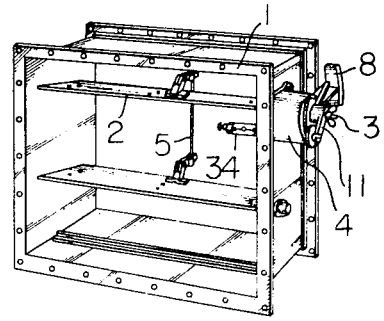
Figure 3:
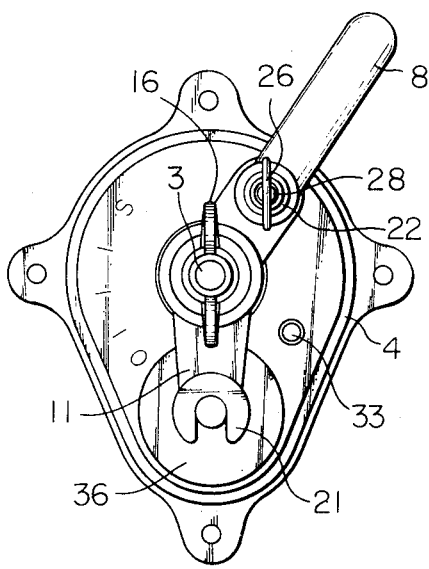
Figure 4:
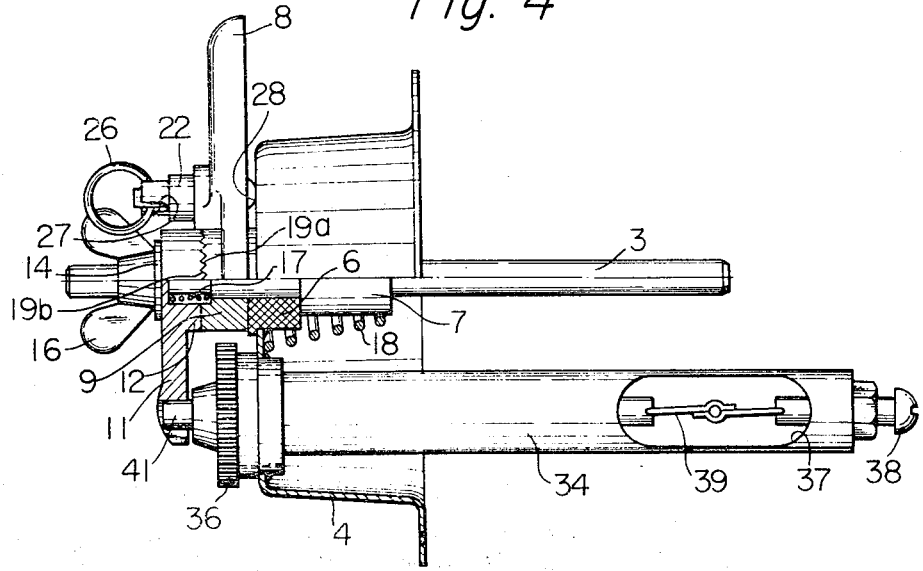
Figure 5:
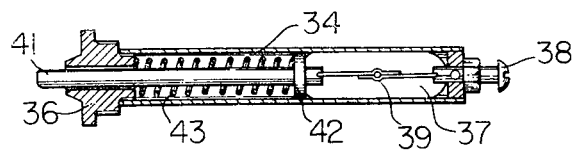
Figure 6:
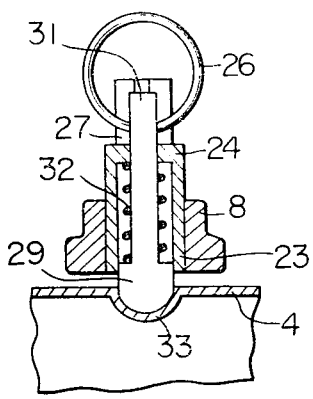
Figure 7:
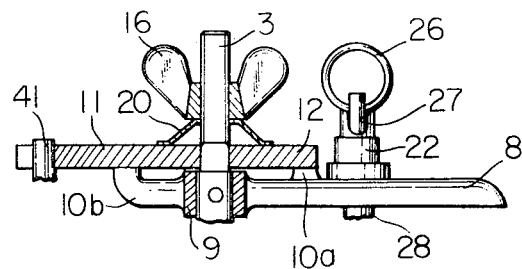

Other features and advantages of the present invention will be apparent from the ensuing description, reference being made to the accompanying drawings, wherein:

FIG. 1 is a perspective view of an embodiment of a duct arrangement provided with a fuse-melt-type apparatus of the present invention, FIG. 2 is a perspective view of another embodiment of the duct arrangement provided with a fuse-melt-type apparatus of the present invention, FIG. 3 is a plan view of an embodiment of the fuse-melt-type apparatus of the present invention, FIG. 4 is a partly sectional view of the apparatus shown in FIG. 3, FIG. 5 is a vertical sectional view of a fuse arrangement used in the apparatus shown in FIG. 3, FIG. 6 is a vertical sectional view of a locking member used in the apparatus shown in FIG. 3, FIG. 7 is a fragmentary sectional vertical view of an embodiment of the engagement of hand-operable handles with an arm used in the apparatus of the present invention.

Referring to FIGS. 1 and 2 a damper frame 1, which is encircled by a side wall of a duct, is provided with a transverse cross-sectional profile compatible with a transverse cross-sectional profile of the duct and is disposed in an arrangement transversing the duct. A butterfly damper 2 is pivotally disposed to the sidewall of the damper frame 1 in an arrangement axially mounted onto a damper shaft 3 extending through the wall of the damper frame 1.

Referring to FIGS. 3 and 4 a casing 4 to be secured to the sidewall of the damper frame 1, as shown in FIGS. 1 and 2, is provided with a bearing 6 disposed to a bottom wall thereof. The damper shaft 3 is provided with an enlarged diametral portion 7 and is supported by the bearing 6 at the enlarged diametral portion 7. A manually operable handle 8 is secured to an outside extension of the damper shaft 3, which extends outside the bottom wall of the casing 4, by a boss 9, in an arrangement in which the bearing 6 is sandwiched by the enlarged diametral portion 7 of the damper shaft 3 and the boss 9 of the manually operable handle 8. An arm 11 is also pivotally mounted onto the outside extension of the damper shaft 3 by its boss 12 and a compression spring 17 encircling the damper shaft 3 is disposed in between the boss 9 and the boss 12. Further, a wing nut 16 is mounted onto the outside extension of the damper shaft 3 by a washer 14 so as to clamp the arm 11 against the handle 8 by the compression spring 17. A helical spring 18 encircling the damper shaft 3 is disposed within the casing 4 with one end thereof being secured to an inside surface of the bottom wall of the casing 4 and another end thereof being secured to the enlarged diametral portion 7 of the damper shaft 3. A pair of facing surfaces of the arm 11 and the handle 8 are provided with radially formed teeth 19a, 19b which are mutually compatible. That is, the teeth 19a, 19b extend radially, from a common central axis of the bosses 9 and 12, respectively. A free end of the arm 11 branches forming a curved portion 21 receptive of a rod 41.

Referring to FIG. 6 the manually operable handle 8 is provided, at its stem portion, with a cylindrical protuberance 22 having a bore portion 23 of an enlarged diameter and a bore portion of a small diameter integral with the bore portion 23. A small diametral portion 24 of the cylindrical protuberance 22 branches forming a groove 27 receptive of a ring 26. An annular locking pin or member 28 is composed of a large diametral portion 29, which corresponds to the internal diameter of the cylindrical protuberance 22, and a small diametral portion 31. The annular locking member 28 is inserted into the cylindrical protuberance 22 by a spring 32 in a pivotal and slidable arrangement. The small diametral portion 31 of the locking member 28 is provided with the ring 26 encircling the locking member 28 and the freedom of the sliding motion of the locking member 28 through the cylindrical protuberance 22 is restricted by the mechanical relationship between the ring 26 and the groove 27. The bottom wall of the casing 4 is provided with a recess 33 receptive of the large diametral portion 29 of the locking member 28 and formed at a location corresponding to the angular location of the damper shaft 3 at the complete closing of the damper 2.

Referring to FIGS. 4 and 5, an annular casing 34 which is to be inserted into the damper frame 1 through the sidewall of the damper frame 1 in an arrangement not to bar a prescribed pivotation of the damper such as shown in FIGS. 1 and 2 through the bottom wall of the casing 4 by a threaded bearing 36. The casing 34 is provided with an opening 37 formed at a portion to be inside the damper frame 1 and the damper frame side end of the casing 34 is provided with an adjusting bolt 38 threaded thereinto. At the location of the opening 37, a fusible member 39, which is composed of a pair of partially superposed plates, is secured to a groove formed to an end of the bolt 38 in a detachable arrangement. Another end of the fusible member 39 is detachable disposed to a groove formed on one end of the rod 41. Thusly, the rod 41, which is connected to the bolt 38 by the fusible member 39, is contained within the casing 34 in a slidable condition in an arrangement that a compression spring 43 encircling the rod 41 is sandwiched by the bearing 36 on another end of the casing 34 and the large diametral portion 42 of the rod 41. Free end of the rod 41 is located at a position detachable from the curved portion 21 of the arm 11.

The operational feature of the fuse-melt-type apparatus having the aforementioned mechanical design is as follows.

By loosening the wing nut 16, the arm 11 is urged by the expansion of the compression spring 17 inserted in between the arm 11 and the manually operable handle 8, both bosses 9 and 12 are spaced apart and the engagement of the arm 11 with the handle 8 is cancelled. Therefore, in this cancelled condition, either of the two members can be freely and easily pivoted manually independently from one another. The axial position of the rod 41 within the casing 34 can be adjusted by operating the adjusting bolt 38. The magnitude of the opening of the damper 2 can be selected as desired by applying a pivoting operation on the manually operable handle 8. As shown in FIG. 4 engagement between the arm 11 and the handle 8 can be achieved by fastening the wing nut 16 so as to put the toothed surfaces of the bosses 9 and 12 in a pressure engagement. By connecting the handle 8 in an adequately selected angular location with the arm 11, which is in engagement with the rod 41, through fastening of the wing nut 16, the damper 2 is set to an opening magnitude corresponding to the selected angular location of the handle 8. In a condition where the ring 26 is inserted into the groove 27 of the protuberance, the locking member 28 is urged against the bottom wall of the casing 4 by the compression spring 32 such as shown in FIG. 4. However, when the ring 26 is brought into a position crossing or transverse of the groove 27, the locking member 28 is released such as shown in FIG. 7.

In the initial setting of the apparatus of the present invention to the damper frame 1, the damper 2 should be set to a fully closed condition, that is, the damper 2 should be put in a condition perpendicular to the advancing direction of the flow through the duct, with the manually operable handle 8 being put in an angular location designated as "S" on the bottom wall of the casing 4 as shown in FIG. 3, whereon the recess 33 is located. The damper 2 may be set to a fully opened condition, that is, the damper 2 should be put in a condition parallel to the advancing direction of the flow through the duct, with the manually operable handle 8 being put in an angular location designated as "O" on the bottom wall of the casing 4. By thus setting the arrangement, the opening of the damper can be selected as desired by referring to the dial from "O" to "S." The damper frame 1 of the present invention is disposed to the duct with the damper being set in an adequately selected opening. Upon passing of an abnormally overheated medium through the duct, the heat-fusible member 39, which is in an arrangement exposed to the flow of the medium, is partially melted and the two plates are separated due to this fuse melting. With this separation of the two plates, the restriction applied onto the compression spring 43 is cancelled and the large diametral portion 42 of the rod 41 is urged so as to draw the rod 41 into the casing 34. By this insertion of the rod 41 into the casing, the connection between the rod 41 and the cured portion 21 of the arm 11 is cancelled. Upon this cancellation of the connection, the damper 2, which is urged by the helical spring 18 so as to pivot to the angular position corresponding to the complete closing thereof, performs a pivotal movement together with the arm 11 and the handle 8 for intercepting the flow of the overheated medium. Simultaneously with this pivotal movement of the damper 2, the locking member 28, which is urged by the spring 32, is received into the recess 33 such as shown in FIG. 6, which is formed on the bottom wall of the casing 4 at the location corresponding to the closing of the damper 2. By this reception of the locking member 28, a restriction is effected on the handle 8 and damper 12, which forms one body with the handle 8, and they are maintained at the location corresponding to the closing of the damper 2.

Due to the aforementioned closing of the damper, accidental passage of the overheated fluid medium flow can be intercepted effectively and a fire which could be caused by the passage of the overheated medium flow can be perfectly prevented.

The above-described apparatus may be used for not only a single damper arrangement such as shown in FIG. 1 but also for a multidamper arrangement such as shown in FIG. 2 by utilizing a connector 5. This apparatus is characterized by using the helical spring 18 as the damper shaft urging means. In this arrangement, one end of the spring 18 is stationary to the wall of the casing 4 and another end of the spring is fixed to the damper shaft 3. This spring mechanism can be replaced with a dead weight disposed on an arm radially secured to the damper shaft 3. In this case, the manually operable handle can be used in connection with the arm or an independent arm can be employed also. The dead weight may be disposed to the damper 2 itself. In the case of the multidamper arrangement, the connector 5 can be utilized as the dead weight.

In the apparatus of the present embodiment as shown in FIG. 4, the engagement between the arm 11 and the manually operable handle 8 is given in the form of a combination of the naturally arranged teeth on the bosses 9 and 12 in a relatively facing condition engageable at every designated position when pivoted and a clamping of the teeth 19a, 19b by a thread clamp 16 disposed to the damper shaft 3 and resilient member 17 sandwiched by the bosses 9 and 12.

As shown in FIG. 7 it is also possible to provide the aforementioned engagement in the form of a pressure contact between facing surfaces of a frictional nature of an arm 11 and projections 10a, 10b disposed on a manually operable handle 8 and a clamping of the contact by a thread clamp 16 disposed on the damper shaft 3 and a resilient member 20 sandwiched by the boss 12 of the arm and the thread clamp 16.

What is claimed is:

1. In a butterfly damper arrangement having a damper shaft extending in use into a duct in a pivotal disposition and a manually operable handle for selecting opening magnitudes of said damper and secured externally of said duct to said damper shaft, an improved heat-fusible type apparatus for controlling intercepting of a flow of an overheated fluid medium through said duct comprising, in combination, an arm coaxial with said shaft mounted for pivotal movement with said handle externally of said duct and selectively disengageable from said handle for placement angularly relative to said shaft independently of said handle, means for urging said damper shaft towards an angular position corresponding to a closed position of said damper, a fusible element having one end secured, means on said heat-fusible type apparatus securing said one end, said fusible element being disposed internally of said duct exposed to a flow of said fluid medium through said duct in operation, a rod slidable axially into said duct with one end connected to a free end of said fusible element and another end externally of said duct engageable by said arm to hold said damper in an open position, means for cancelling said engagement of said rod end with said arm upon thermal melting of said fusible element, and means for accurately defining said angular position of said damper shaft corresponding to said closing of said damper.

2. In a butterfly damper arrangement according to claim 1, wherein said means urging said shaft toward said angular position is a helical spring biasing said damper shaft, one end of which is stationary relative to said duct and another end of which is fixed to said damper shaft.

3. In a butterfly damper arrangement according to claim 1, wherein said means urging said shaft to said angular position is a dead weight, and an arm radially secured to said damper shaft mounting said dead weight.

4. In a butterfly damper arrangement according to claim 1, wherein said means urging said shaft toward said angular position is a dead weight secured to said damper.

5. In a butterfly damper arrangement according to claim 1, wherein said means cancelling said engagement of the arm and rod is a compression spring biasing said rod axially into said duct.

6. In a butterfly damper arrangement according to claim 1, wherein said arm and said handle have mutually engageable and disengageable teeth on surfaces relatively facing one another, and means releasably clamping said teeth in mutual engagement, whereby said handle and said arm pivot with said shaft and said arm is positionable at different angular positions relative to said handle and said shaft.

7. In a butterfly damper arrangement according to claim 1, wherein said arm and said handle comprise facing frictional surfaces effecting frictional engagement between said arm and said handle and means releasably clamping said arm and said handle into frictional engagement so that said handle and arm move jointly with said damper shaft.

8. In a butterfly damper arrangement according to claim 1, wherein said means defining said angular position includes a locking member slidably disposed through said handle and a compression spring disposed urging said locking member towards said duct, said duct having a recess receiving said locking member as said damper shaft pivots upon melting of said fusible element, and said recess being located in conformity to said angular position of said damper shaft corresponding to said closing position of said damper.

9. A butterfly damper apparatus for use in combination with a duct through which a heated fluid flows comprising, a butterfly damper positioned in use within a duct for interrupting flow of a heated fluid flow through said duct, a rotatable shaft extending axially into said shaft and on which said damper is mounted for rotation thereof, an operating member on said shaft mounted externally of said duct for selectively positioning the shaft at selected angular positions positioning the damper in a closed position interrupting completely fluid flow through said duct and to at least one other angular position in which the damper is in an open position allowing heated fluid to flow through said duct, first biasing means biasing the damper to said closing position, a locking member mounted in use externally of said duct locking rotation of said shaft in an angular position in which the damper allows fluid flow through said duct, a heat-activated release device mountable as a unit on said duct cooperating with said locking member for maintaining said locking member in a locking position and releasing said locking member, means on said release device for removably mounting said release device on said duct for removal therefrom as a unit independently of said locking member, said shaft, and said damper, said release device comprising a rod positioned in use extending axially into said duct and having a part effective to releasably maintain said locking member in a locking position, means mounting said rod movably, second biasing means on said device biasing said rod toward a position rendering it ineffective to maintain said locking member in a locking position, a heat-fusible element on said release device coactive with said rod internally of said duct releasably holding it in a position in which said rod is effective to maintain said locking member in a locking position, means mounting said heat-fusible element on said device internally of said duct subject to the heat from said heated fluid flow through said duct, whereby when the temperature of said fluid exceeds a given level said fusible element melts and the last-mentioned biasing means biases said rod to said position rendering the rod ineffective to maintain said locking member in a locking position and the first-mentioned biasing means biases said shaft to said position in which said damper is disposed interrupting completely fluid flow through said duct.

10. A butterfly damper apparatus according to claim 9, in which said operating member comprises a manually operated handle connected to said shaft.

11. A butterfly damper apparatus according to claim 9, in which said release device comprises a sleeve in which said rod is disposed extending axially therein and a part thereof extends outwardly externally of said duct, means mounting said locking member movably rotationally for releasable engagement with said part of said rod and rotation with said shaft, said part of said rod being disposed in the path of rotation of said locking member maintaining said locking member in a locking position, said second biasing means biasing said rod axially to remove it from the path of rotation of said locking member when said heat-fusible member melts, and said sleeve having openings positioned for said heat-fusible member to be subjected to said heated fluid flow through said duct.

12. A butterfly damper apparatus for use in combination with a duct through which a heated fluid flows comprising, a butterfly damper positioned in use with a duct through which a heated fluid medium flows and biased to an angular position in which said damper closes said duct, a shaft mounting said damper for pivotal movement to a position in which said duct is open to allow flow of said fluid medium therethrough and to said position in which said damper closes said duct to interrupt flow of said fluid medium through said duct, control means including means connected to said shaft externally of said duct for angularly positioning said damper by angular movement of said shaft, a heat-activated device controlling said damper to allow closing of said duct when the temperature of said fluid medium exceeds a given temperature comprising a heat-fusible element, means mountable on said duct mounting said heat-fusible element internally of said duct for sensing the heated fluid medium, movable lock means held stationary by said heat-fusible element and disposed coacting with said control means connected to said shaft externally of said duct for releasably locking said shaft from rotation when in said angular position in which said duct is open and displaceable to another position releasing said control means to allow pivotal movement of said shaft to the position in which said damper closes said duct, means urging said lock means to displace and release said control means, whereby when said fusible element melts said lock means is displaced thereby releasing said control means and allowing movement of said biased damper to said position closing said duct, and means mounting said lock means and said heat-fusible element for independent easy removal from said duct and butterfly damper apparatus for replacing said heat-fusible element.

* * * * *